United States Patent [19]

Long

[11] Patent Number: 4,630,133
[45] Date of Patent: Dec. 16, 1986

[54] VCR WITH TOTAL RECORD/VIEW FLEXIBILITY

[75] Inventor: Michael E. Long, Western Springs, Ill.

[73] Assignee: Zenith Electronics Corporation, Glenview, Ill.

[21] Appl. No.: 711,698

[22] Filed: Mar. 14, 1985

Related U.S. Application Data

[63] Continuation of Ser. No. 450,824, Dec. 20, 1982, abandoned.

[51] Int. Cl.⁴ .............................................. H04N 5/782
[52] U.S. Cl. .................................... 358/335; 360/33.1
[58] Field of Search ..................... 358/86, 181, 191.4, 358/194.1, 114, 115, 123, 335; 360/33.1

[56] References Cited

U.S. PATENT DOCUMENTS

| | | | |
|---|---|---|---|
| 4,031,548 | 6/1977 | Kato et al. | 360/33.1 |
| 4,267,563 | 5/1981 | Sato et al. | 358/335 |
| 4,272,791 | 6/1981 | Rifken | 360/33.1 |
| 4,400,735 | 8/1983 | Strammello, Jr. | 358/181 |
| 4,488,179 | 12/1984 | Krüger et al. | 358/181 |

*Primary Examiner*—Donald McElheny, Jr.

[57] ABSTRACT

A VCR includes a single two-way signal splitter and a plurality of RF switches for interconnecting a source of television signals, a television receiver, and a decoder or converter to enable complete flexibility in viewing of any channel while recording of any channel, including a channel requiring a decoder without incurring additional signal loss.

2 Claims, 2 Drawing Figures

LOGIC TABLE

| RECORD | VIEW | A | B | C | D | E |
|---|---|---|---|---|---|---|
| PAY | PAY | 1 | 0 | 1 | 1 | 0 |
| PAY | CABLE | 1 | 0 | 0 | 1 | 0 |
| CABLE | PAY | 0 | 1 | 0 | 0 | 0 |
| CABLE | CABLE (SAME CH.) | 0 | 0 | 1 | 0 | 1 |
| CABLE | CABLE (DIFF. CH.) | 0 | 0 | 0 | 0 | 1 |
| — | CABLE (VCR OFF) | 0 | 0 | 0 | 0 | 1 |
| — | PAY (VCR OFF) | 0 | 1 | 0 | 0 | 0 |
| — | VCR (PLAYBACK) | 0 | 0 | 1 | 0 | 1 |
|  |  |  |  |  | (D = A) | (E = $\overline{A} \cdot \overline{B}$) |

VCR WITH TOTAL RECORD/VIEW FLEXIBILITY

This application is a continuation, of application Ser. No. 450,824, filed Dec. 20, 1982 abandoned.

BACKGROUND OF THE INVENTION

This invention relates generally to video cassette recorders (VCR's) for television systems and specifically to VCR's for television systems wherein multichannel signals are receivable, including an encoded channel signal viewable only with an appropriate decoder device.

In addition to over-the-air, "free" television broadcasts, a large demand and corresponding market for cable-connected "pay" television and over-the-air, "pay" television broadcasts has arisen. Cable systems involve a direct connection or cable to each subscriber's television receiver. The cable operator supplies to his subscribers all normally receivable over-the-air television signals in the area as well as special programming and in many instances, locally originated programming. The cable may also carry one or more encoded signals which can only be received by subscribers who have paid an additional fee for an appropriate decoder mechanism.

There are also over-the-air "pay" television signals that, while being receivable by all conventional television receivers, are only "viewable" by television receivers operated in conjunction with suitable decoders. In this arrangement the broadcast television signal is scrambled so that a decoder-less television receiver will not produce a viewable picture and/or acceptable sound.

In general, television receivers connected to cable systems are not used for over-the-air signal reception and receivers arranged to receive broadcast signals are not used for cable reception.

VCR's, which are simply tape recorders for television signals, have also grown in popularity and afford the viewer a great deal of flexibility in his viewing habits since television programs may be recorded for viewing at a later time. It is common to find television receiver installations having a cable system (or an over-the-air system) with an encoded channel capability operated alongside a VCR. Indeed, both the television receiver and the VCR may be equipped with remote control devices for complete operation from the viewer's easy chair. Thus has arisen a need to permit the viewer complete flexibility in determining whether to record a particular channel including a pay or encoded channel while watching another channel or record the channel he is watching—all from the comfort of his chair.

VCR's are presently capable of permitting the viewing of any received television channel signal while recording any other television channel signal, including the received one except where a channel signal requires a decoder. Thus, without the use of external splitters and RF switches, it is not practical to watch one channel while recording another if either of the channels involved requires a decoder, i.e., is a pay channel.

There have been recently proposed VCR arrangements which in one instance would enable simultaneous recording of a pay channel while viewing another channel or vice versa, but which would entail added signal loss by requiring another signal splitter in addition to the signal splitter normally included in the VCR. Consequently, there is a need in the art for a VCR which is capable of permitting viewing of any channel while recording any channel, including channels requiring separate decoders, without incurring additional signal loss or complicated external switching schemes.

SUMMARY OF THE INVENTION

In accordance with one aspect of the invention a video system comprises a television receiver connectable to a source of multichannel signals including a channel having an encoded signal, a decoder for decoding the encoded signal, a VCR including a two-way signal splitter, a tuner and switching means in the VCR interconnecting the decoder, the television receiver, and the tuner for enabling complete flexibility in viewing and recording among the signals on all the channels including the channel having an encoded signal without incurring additional signal loss.

In accordance with another aspect of the invention a VCR includes terminals for connecting to a source of multichannel signals, including a channel carrying an encoded signal, a decoder for decoding the encoded signal and a television receiver. The VCR also includes a tuner for selecting any of the channels for recording, a channel modulator connected to the terminals, a two-way signal splitter with an input coupled to the terminals for receiving multichannel signals from the source, and switching means coupled between the output of the signal splitter, the terminals, the tuner and the channel modulator for permitting viewing of any of the channels while recording any of the channels.

OBJECTS OF THE INVENTION

Accordingly, a principal object of the invention is to provide an improved video system.

Another object of the invention is to provide a novel VCR.

A further object of the invention is to provide a video system including a VCR capable of recording any channel while permitting viewing of any channel including a channel requiring a decoder, without incurring additional signal loss.

BRIEF DESCRIPTION OF THE DRAWING

Further objects and advantages of the invention will become apparent from reading the following description in conjunction with the drawing in which.

DESCRIPTION OF THE PREFERRED EMBODIMENT

Figures 1, 2:
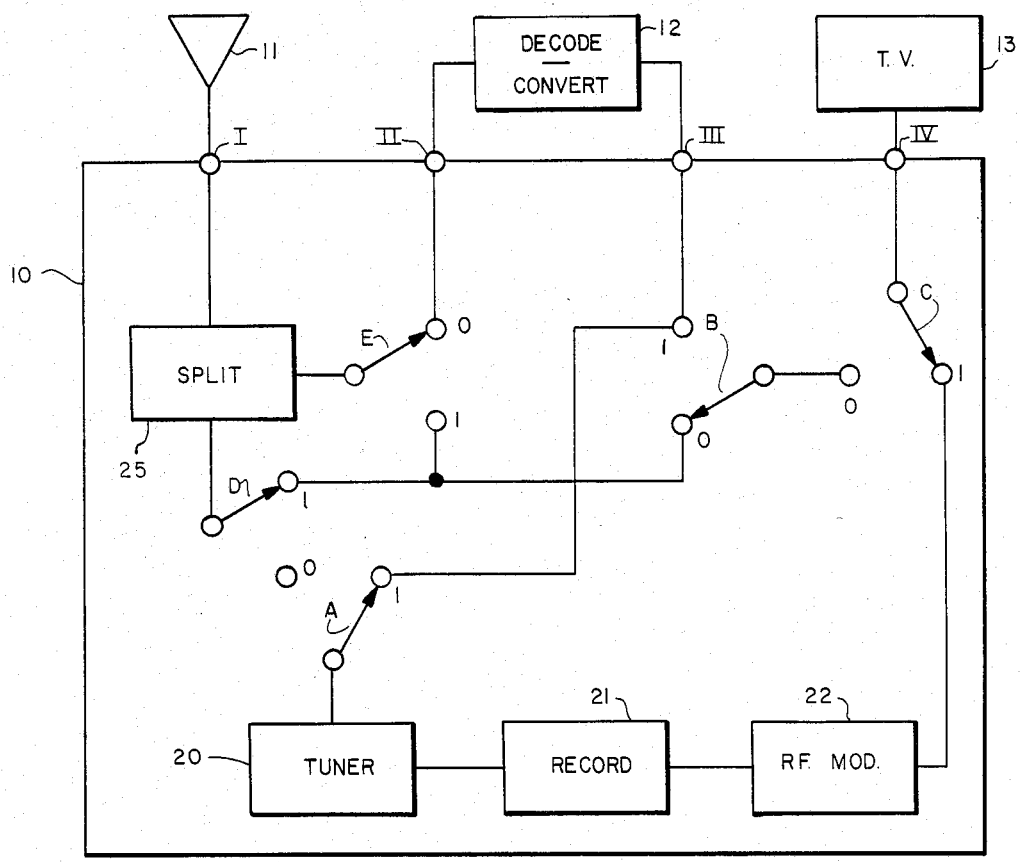
FIG. 1 represents a schematic diagram of a video system including a VCR constructed in accordance with the invention.
FIG. 2 represents a logic table indicating the various positions of the switches for the various combinations of RECORD and VIEW of the channels.

Referring to FIG. 1, the improved VCR is generally designated by reference numeral 10 and includes four terminals labelled I, II, III and IV. Terminal I is connectable to an antenna 11, which should be understood to indicate either a source of over-the-air television signals or of cable-connected television signals. Terminals II and III are connected to a decoder or converter 12. Should over-the-air television signals be coupled from terminal I to terminal II, block 12 could comprise a decoder for unscrambling the encoded signal of an over-the-air pay channel. Should a source of cable connected television signals be coupled to terminal II, block 12 could comprise a CATV converter/decoder. Terminal IV is connected to a conventional television receiver 13, which is capable of being tuned to receive any VHF or UHF channel.

The functional parts of the VCR are conventional and include a tuner 20, similar to the tuner in television receiver 13, for tuning the VCR unit to any of the VHF and UHF channels. Tuner 20 is connected to a record module 21, which includes the magnetic tape drive mechanism and associated electronics for recording the channel signal information translated by tuner 20 onto magnetic tape. Record module 21 is coupled to an RF modulator 22 which, as is known in the art, functions to take the signal from the recording tape or the signal passing through the record module electronics and modulate it onto a carrier frequency corresponding to a selectable unused VHF channel, generally either VHF channel 3 or VHF channel 4 for application to appropriately tuned television receiver 13 to enable viewing of the recorded information. As in all VCR's, a two-way signal splitter 25 is provided for enabling two separate loads to be supplied by the input signal on terminal I without serious degradation or interference. The two-way signal splitter also permits simultaneous recording of one channel and viewing of another channel.

Terminal I is connected to the input of splitter 25 which has two outputs, each of which is connected to the common terminal of a switch D and a switch E. Tuner 20 is similarly connected to the common terminal of a switch A. Each switch has two positions, one denoted "0" and one denoted "1" which will be seen to correspond to logic levels, since the switches may be microprocessor controlled. Terminal II is connected to the 0 terminal of switch E and terminal III is connected to the 1 terminal of a switch B. The 1 terminals of switches D and E are connected together and to the 0 terminal of switch B. Similarly, the 1 terminals of switches A and B are connected together. Finally, a switch C has its common terminal connected to terminal IV and its 1 terminal connected to the output of RF modulator 22. It's 0 terminal is connected to the common terminal of switch B. Switch C will be recognized as being standard in VCR's.

Referring to FIG. 2, it will be seen that the logic table lists various positional combinations for the switches. It should be understood that cable is used to indicate air signals also. In the lower right hand corner of the table a note indicates that the position of switch D is always equal to the position of switch A. Thus when switch A is in its 0 position, switch D is in its 0 position and when switch A is in its 1 position, switch D is in its 1 position. Similarly, the position of switch E is defined by the logic statement of "not A" and "not B". Thus, when switch A and switch B are both in their 0 positions, switch E is in its 1 position. For any other combinations of positions of switches A and B, switch E is in its 0 position. The logic table specifies the switch positions for the various combinations of recording and viewing any channel.

These combinations may be verified by placing the switches in the positions indicated by the logic table for each of the RECORD/VIEW conditions listed and tracing through the circuits. At no time is more than one load connected to a source despite the fact that only a single two-way splitter is incorporated. Consequently, the switching arrangement introduces no additional signal loss while providing the complete flexibility of watching any channel, including a pay channel, while viewing any channel, including the pay channel. The switches should of course be RF types to preclude signal loss due to their presence.

It will also be appreciated that the switches are shown in diagramatic form only. They may be of the mechanical type or they may comprise electronic switches having no moving parts. They may also readily be arranged to be microprocessor controlled. Lastly, the switches may conveniently be remotely controlled as can be the functions of the television receiver and VCR. Thus a viewer may remotely select any combination of channels to record and view in addition to remotely controlling the normal television and VCR functions. In that instance, particularly, switches B and E would be operated independently when the VCR is off to permit remote selection of normal cable or pay channels for viewing on the television receiver.

What has been described is a novel VCR having a switching arrangement which enables viewing of any channel, including a premium or pay channel, without incurring additional signal loss. It is recognized that numerous changes in the described embodiment will be apparent to those skilled in the art without departing from the invention. The invention is to be limited only as defined in the claims.

What is claimed is:
1. A video system comprising:
a television receiver having a signal input;
a decoder means having an input and an output;
an antenna/cable source of multichannel signals, including a channel having an encoded signal; and
a VCR having a first terminal connected to said source of multichannel signals, a second and a third terminal connected to the input and the output of said decoding means, respectively, and a fourth terminal connected to the signal input of said television receiver, said VCR including:
a two-way signal splitter having an input, connected to said first terminal, and first and second outputs;
recording means including a television signal tuner, a signal recording device and an RF modulator, said recording means having an input terminal and an output terminal; and
switching apparatus comprising first, second, third, fourth and fifth switch means;
said first switch means for establishing a conductive path from said first output of said splitter to said input of said decoding means or to said second and fourth switch means;
said second switch means for establishing a conductive path from said second output of said splitter to said first switch means and said fourth switch means or to said third switch means;
said third switch means for establishing a conductive path from the input of said recording means to said second switch means or to said output of said decoder means and said fourth switch means;
said fourth switch means for establishing a connection to the output of said decoder means and said third switch means or to said first and said second switch means; and
said fifth switch means for establishing a conductive path between said signal input of said television receiver and the output of said recording means or to said fourth switch means.
2. The system of claim 1, wherein said switch means comprise RF switches.

* * * * *